United States Patent [19]

Sanger et al.

[11] 4,195,224
[45] Mar. 25, 1980

[54] GAS LEAKAGE DETECTION APPARATUS

[75] Inventors: Georg Sänger, Voorschoten; Alfred K. Franz, Lisse, both of Netherlands

[73] Assignee: Organisation Europeenne de Recherches, Paris, France

[21] Appl. No.: 945,630

[22] Filed: Sep. 25, 1978

[30] Foreign Application Priority Data

Oct. 4, 1977 [BE] Belgium .................................. 181438

[51] Int. Cl.² ............................................. B01D 59/44
[52] U.S. Cl. ..................................... 250/289; 250/281
[58] Field of Search ............... 250/281, 282, 289, 288; 73/407

[56] References Cited

U.S. PATENT DOCUMENTS

| | | | |
|---|---|---|---|
| 3,057,996 | 10/1962 | Boyer | 250/289 |
| 3,227,872 | 1/1966 | Nemeth | 250/289 |
| 3,992,626 | 11/1976 | Bursack | 250/289 |

*Primary Examiner*—Harold A. Dixon
*Attorney, Agent, or Firm*—McCormick, Paulding & Huber

[57] ABSTRACT

A gas leakage detection apparatus is described comprising a mass spectrometer with which there is associated a first pumping device for creating a relative vacuum in the apparatus, a selective pumping device having a first pumping speed for air and a second pumping speed for the gas which is to be analyzed, said second pumping speed being lower than the said first pumping speed, and a throttling device connected between the selective pumping device and the first pumping device, this throttling device having an opening chosen so as to let through a flow which is very small compared with the flow produced by the selective pumping device for the air.

1 Claim, 1 Drawing Figure

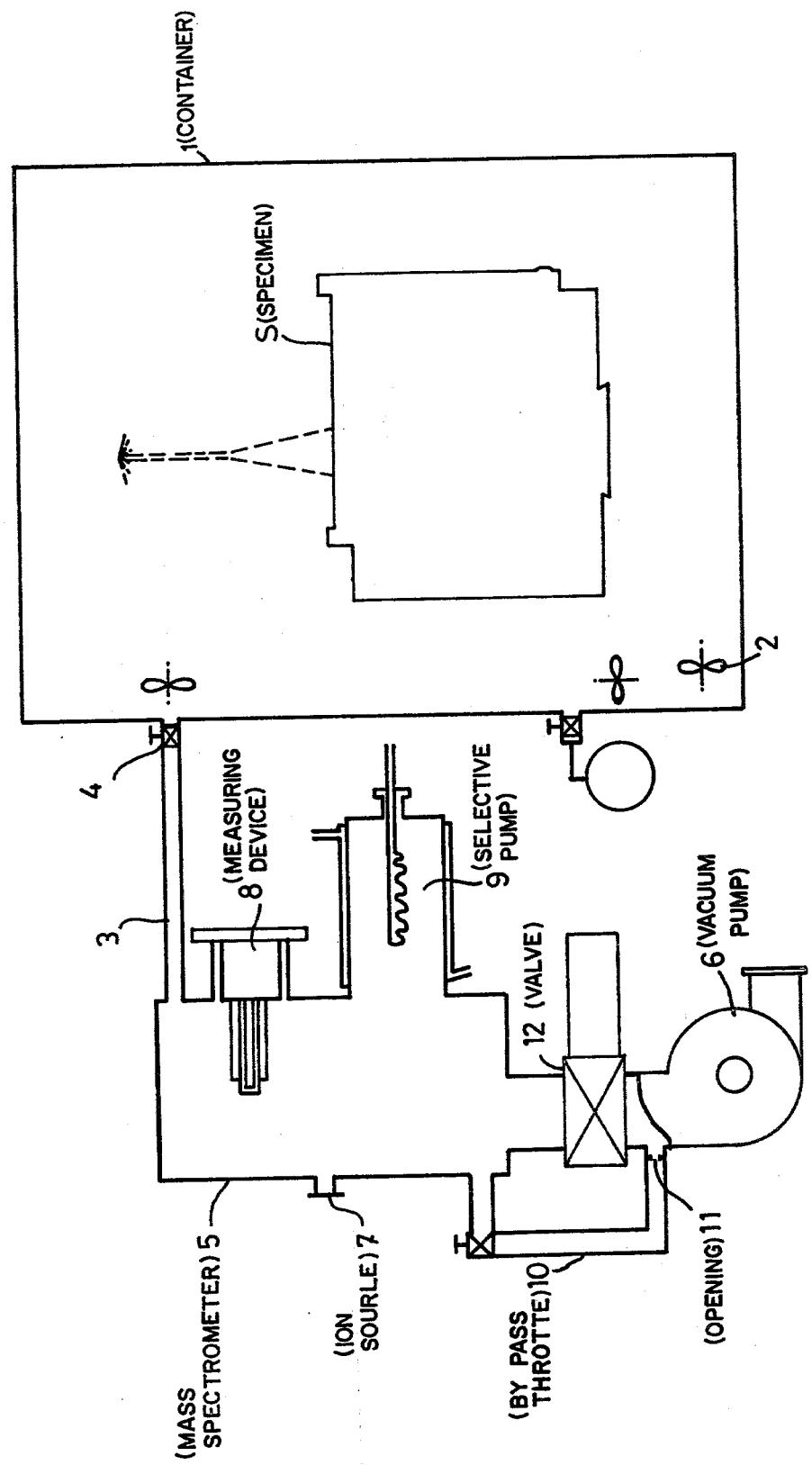

GAS LEAKAGE DETECTION APPARATUS

BACKGROUND OF THE INVENTION

The present invention relates to a gas leakage detection apparatus using a mass spectrometer.

The leakage detector commonly used is the helium detector, which essentially comprises a mass spectrometer adapted to detect the presence of helium. The analyser tube of the mass spectrometer is kept in a system under vacuum into which air containing helium is passed. As the concentration of helium in the air is low, the total pressure in the system under vacuum is given by the flow rate of the air. The partial pressure of the helium $P_{He}$ is proportional to the flow rate $\dot{Q}$ according to the equation:

$$\dot{Q} = P_{He} \cdot S$$

wherein S is the pumping rate of the apparatus.

In practice, the sensitivity of detection is limited by two factors:

(1) the low sensitivity of the mass spectrometer in the range of very high vacuums where the noise level is very low: this is, in fact, the minimum detectable partial pressure which at present corresponds to $10^{-13}$ to $10^{-14}$ mm Hg of nitrogen (i.e. $1.333 \times 10^{-11}$ to $1.333 \times 10^{-10}$ Pa);

(2) the noise level which is much higher than the minimum detectable partial pressure when the operational pressure is maintained within the usual range of from $10^{-4}$ to $10^{-6}$ mm Hg ($1.333 \times 10^{-2}$ to $1.333 \times 10^{-4}$ Pa)

The limitation of sensitivity due to the first factor can be overcome by increasing the flow rate in the system under vacuum and/or by throttling the pumping rate. These two actions have the effect of increasing the partial pressure of the gas, but they also result in an increase in the operational pressure of the system under vacuum and consequently in the noise level, which increases more or less proportionally with the total pressure. The limitation due to the second factor mentioned above makes it possible to detect a partial pressure five or six order of magnitude lower than the total pressure; for the range of pressures indicated above, the detectable partial pressure may be of the order of $10^{-9}$ to $10^{-12}$ mm Hg ($1.333 \times 10^{-7}$ to $1.333 \times 10^{-10}$ Pa).

Various attempts have been made to reduce this dependence of sensitivity with regard to noise (for example, the use of a double concentration, baffle plates, ion counting) but all these attempts have resulted in fairly expensive equipment and the best results obtained have been the detection of partial pressures about eight orders of magnitude lower than the total pressure.

SUMMARY OF THE INVENTION

The invention sets out to provide a detection apparatus which operates with a high partial gas pressure for a low operational pressure and which is distinguished by a low noise level.

The apparatus according to the invention comprises a mass spectrometer with which there is associated a first pumping device for creating a relative vacuum in the mass spectrometer chamber. It also comprises a selective pumping device having a first pumping speed for air and a second pumping speed for the gas which is to be analysed, the second pumping speed being lower than the said first pumping speed, and a throttling device connected between the selective pumping device and the first pumping device, this throttling device having an opening adapted to let through a flow which is very small compared with the flow produced by the selective pumping device for the air.

DESCRIPTION OF THE DRAWING

The accompanying drawing diagrammatically shows an experimental embodiment used in a tent-type leakage detection apparatus, i.e. an apparatus wherein the specimen being tested is kept in a sealed enclosure called a tent.

DESCRIPTION OF AN EMBODIMENT

In the drawing accompanying this description, S denotes the specimen being tested which is contained in the tent shown at 1. However, it will be appreciated that the apparatus according to the invention may equally well be used in a suction-type detection apparatus. The aim of the test is to measure the leakage of a gas enclosed in the specimen S. As a result of this leakage, the concentration of the gas in the air contained in the enclosure of the tent 1 increases continuously. A homogeneous mixture of the air and this gas is ensured by ventilators which are diagrammatically shown at 2.

The detection apparatus according to the invention is connected to the tent 1 by the duct 3 which contains a valve 4 through which a flow of the gas/air mixture passes. The detection apparatus comprises a mass spectrometer 5 which is associated with a pump unit 6 adapted to produce the required vacuum in the device 5. The mass spectrometer is a well known apparatus which produces ions of the gas which is to be analysed and separates them according to their ratio of charge to mass so as to determine the mass of the ions of each type. This device comprises an ionisation source diagrammatically shown at 7 and a measuring device diagrammatically shown at 8. The apparatus is calibrated by injecting a known quantity of gas into the tent 1 and measuring the resultant signal.

According to the invention, the mass spectrometer also comprises a selective pumping device 9 and a throttling device 10 having an opening 11 of suitable dimensions. The selective pumping device may consist of any arrangement having a higher pumping speed for air and a lower pumping speed for the gas to be analysed. Typical examples of suitable arrangements are the titanium sublimation pump, the cryogenic pump and the ion reducer pump. The type suitable for use depends on the gas to be analysed. The titanium sublimation pump is particularly suitable for hydrocarbons, freon and noble gases; the cryogenic pump is especially suitable for neon, deuterium and helium since it operates at temperatures within the range from 20° K. to 25° K.; the ion reducer pump is suitable for the detection of noble gases.

The throttling device 10 is connected between the selective pumping device 9 and the pump unit 6. The opening 11 in the throttling device 10 is chosen so that it will let through a gas flow which is very small compared with the pump delivery of the selective pumping device 9.

Owing to the selective pumping effect of the device 9, the air and the gas to be analysed are pumped at different speeds through the opening 11, the gas being pumped at a lower speed than the air, and it has been found that the sensitivity of detection of the gas is increased considerably as a result.

In order to demonstrate this increased sensitivity, the experimental apparatus was fitted, as shown in the drawing, with a valve 12 mounted in parallel on the throttling device 10: when the valve 12 is open, the apparatus functions like a conventional leakage detector and when it is closed, the apparatus functions according to the invention with selective pumping. This experimental apparatus has the following characteristics:

| pumping speed for air | about 400 liters/second |
|---|---|
| leakage rate | about $10^{-3}$ mm Hg liters/sec |
| flow rate through opening of throttling device | about 1 liter/second |

The use of this apparatus to measure the leakage of gas from a spacecraft gave the following result for the composition of the gas:

| | Valve closed | Valve open |
|---|---|---|
| air | $2.5 \times 10^{-6}$ mm Hg | $3.3 \times 10^{-6}$ mm Hg |
| argon | $1 \times 10^{-5}$ mm Hg | $3.3 \times 10^{-8}$ mm Hg |
| Krypton (isotope 84) | $6 \times 10^{-10}$ mm Hg | (approx. $2 \times 10^{-12}$ mm Hg calculated) |

The results illustrate the improvement in the detection sensitivity obtained using the apparatus according to the invention.

What is claimed is:

1. A gas leakage detection apparatus comprising a mass spectrometer with which there is associated a first pumping device for creating a relative vacuum in the apparatus, a selective pumping device having a first pumping speed for air and a second pumping speed for the gas which is to be analysed, said second pumping speed being lower than the said first pumping speed, and a throttling device connected between the selective pumping device and the first pumping device, this throttling device having an opening chosen so as to let through a flow which is very small compared with the flow produced by the selective pumping device for the air.

* * * * *